United States Patent
Zimmerman

(10) Patent No.: US 7,868,759 B2
(45) Date of Patent: Jan. 11, 2011

(54) SHOPPING CART BOTTOM OF THE BASKET ITEM DETECTION

(75) Inventor: Thomas G. Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 11/534,882

(22) Filed: Sep. 25, 2006

(65) Prior Publication Data

US 2008/0074261 A1    Mar. 27, 2008

(51) Int. Cl.
G08B 13/14    (2006.01)
G06K 15/00    (2006.01)
(52) U.S. Cl. ..................... 340/568.5; 235/383
(58) Field of Classification Search .............. 340/568.5, 340/568
See application file for complete search history.

(56) References Cited

U.S. PATENT DOCUMENTS

| 3,725,894 | A | * | 4/1973 | Geisler | 340/568.5 |
|---|---|---|---|---|---|
| 4,327,819 | A | | 5/1982 | Coutta | |
| RE32,151 | E | * | 5/1986 | Scharfenberger | 427/8 |
| 4,736,098 | A | * | 4/1988 | Rehrig | 250/222.1 |
| 5,500,526 | A | | 3/1996 | Shalvi et al. | |
| 5,610,584 | A | | 3/1997 | Schrade | |
| 6,741,177 | B2 | | 5/2004 | Ballantyne | |
| 7,246,745 | B2 | * | 7/2007 | Hudnut et al. | 235/383 |
| 2003/0014217 | A1 | * | 1/2003 | Warner et al. | 702/182 |
| 2003/0184440 | A1 | * | 10/2003 | Ballantyne | 340/568.5 |
| 2005/0189412 | A1 | * | 9/2005 | Hudnut et al. | 235/383 |

* cited by examiner

*Primary Examiner*—Benjamin C Lee
*Assistant Examiner*—Cal Eustaquio
(74) *Attorney, Agent, or Firm*—Jason O. Piche, Esq.; Scott D. Paul, Esq.; Carey Rodriguez Greenberg & Paul LLP

(57) ABSTRACT

Embodiments of the invention address deficiencies of the art in respect to bottom of the basket (BOB) item detection and provide a method, system and computer program product for high-contrast BOB item detection. In one embodiment of the invention, a shopping cart BOB item detection data processing system can include high contrast material applied in proximity to a shopping cart BOB; an optical sensor positioned to generate an image of the high contrast material; BOB detection logic and an alert disposed in proximity to a cash register at the check stand. The BOB detection logic can include program code enabled to analyze the image to detect either an obscuring or an obstruction of the high contrast material. As such, the alert can be operable to issue an alert responsive to the BOB detection logic detecting one an obscuring or an obstruction of the high contrast material.

14 Claims, 3 Drawing Sheets

SHOPPING CART BOTTOM OF THE BASKET ITEM DETECTION

BACKGROUND OF THE INVENTION

1. Field of the Invention

The present invention relates to the field of retail store checkout systems and more particularly to shopping cart bottom of the basket detection.

2. Description of the Related Art

Retail stores suffer millions of dollars of losses each year as a result of the theft of products occurring when customers intentionally or accidentally conceal items on the lower tray of their shopping carts. Retail stores are particularly vulnerable to this problem because store cashiers cannot observe the lower tray of the shopping cart from a store cashier's normal position. Although store cashiers can inspect the contents of the lower tray of a shopping cart by leaning over the checkout counter, this motion poses an inconvenience to the cashier. Furthermore, customers may consider as rude this potentially mistrustful display. Thus, retail stores having multiple cashiers and multiple checkout aisles with multiple checkout counters need a system which would allow the inspection of the lower tray of a shopping cart without needlessly inconveniencing the store cashier, or unintentionally offending the customer.

Several systems have been developed to alert a store cashier to the presence of a parcel positioned on the lower tray of a shopping cart as that cart passes through the checkout aisle. U.S. Pat. No. 4,327,819 issued to Coutta on May 4, 1982 for OBJECT DETECTION SYSTEM FOR A SHOPPING CART, U.S. Pat. No. 4,725,822 issued to Hooley on Feb. 1, 1988 for SHOPPING CART WITH LOWER TRAY SIGNALING DEVICE, and U.S. Pat. No. 4,736,098 issued to Rehrig on Apr. 5, 1988 for SIGNALING METHOD AND APPARATUS FOR A CONVENTIONAL SHOPPING CART each disclose systems whereby a combination of a light transmitter, light detector and a reflector mounted on the lower tray of a shopping cart act in concert to detect the presence of unpaid for articles on the lower tray of a shopping cart passing through a checkout aisle. Unique to the systems described in the these patents is the use of springs which bias the lower tray towards one position so that the increased weight of parcels placed on the lower tray depresses the tray, bringing the reflector into the path of the beam of light emitting from the transmitter.

In recent years, inventions disclosed by several patents have implemented lower tray detection systems using light transmitters and detectors positioned on either side of the checkout aisle. As a result, this type of system eliminates at least the retrofitting requirement of prior systems. In particular, U.S. Pat. No. 5,485,006 issued to Allen et al. on Jan. 16, 1996 for PRODUCT DETECTION SYSTEM FOR SHOPPING CARTS, U.S. Pat. No. 5,495,102 issued to Fine on Feb. 17, 1996 for SHOPPING CART MONITORING SYSTEM, and U.S. Pat. No. 5,610,584 issued to Schrade for DETECTION OF GOODS ON THE BOTTOM RACK OF A CART each include systems having infrared lights sources and detectors positioned across the width of a checkout aisle.

Conventional bottom-of-the-basket (BOB) detectors can require some sort of constant monitoring by checkout personnel. Conventional BOB detectors further can require expensive hardware investments and time consuming shopping cart retrofits in order to accommodate the complicated imaging sensor systems. For many BOB detectors, the cost of the sensing camera can be enormous dissuading widespread adoption. Likewise, more complex detection equipment often translates into substantial training costs for checkout personnel.

BRIEF SUMMARY OF THE INVENTION

Embodiments of the invention address deficiencies of the art in respect to BOB detection and provide a novel and non-obvious method, system and apparatus for high-contrast BOB item detection In one embodiment of the invention, a shopping cart BOB item detection data processing system can include high contrast material applied in proximity to a shopping cart BOB; a light source to illuminate the high contrast material; an optical sensor positioned to generate an image of the high contrast material; BOB detection logic and an alert disposed in proximity to a cash register at the check stand. The BOB detection logic can include program code enabled to analyze the image to detect either an obscuring or an obstruction of the high contrast material. As such, the alert can be operable to issue an alert responsive to the BOB detection logic detecting one an obscuring or an obstruction of the high contrast material.

It is to be recognized that obscuring can include attenuating the brightness of the image, as with a translucent or cloudy liquid; bending light (e.g. a clear liquid or clear plastic), reflecting light (e.g. shiny metal) and filtering light spectra (e.g. colored liquid or solid), or otherwise changing physical properties of light. Obstructing, by comparison, can include totally blocking light (e.g. an opaque body such as a cardboard box), partially blocking light (e.g. wire cage for an animal) and dynamically blocking light (e.g. ball rolling under the basket). It is possible for a BOB object to be of such material and construction to exhibit a plurality of these optical properties, and hence both obscure and obstruct detection of the high contrast material.

In one aspect of the embodiment, the high contrast material can be applied to a bottom rail of the shopping cart BOB nearest to the check stand and a bottom rail of the shopping cart BOB furthest from the check stand. In another aspect of the embodiment, the high contrast material can be applied to a hollow tube surrounding a bottom rail of the shopping cart BOB nearest to the check stand and to a hollow tube surrounding a bottom rail of the shopping cart BOB furthest from the check stand. In yet another aspect of the embodiment, the high contrast material can be applied to a floor surface below the shopping cart BOB. Notably, in one aspect of the embodiment, the high contrast material can include retro-reflective tape. In another aspect of the embodiment, the high contrast material can include colored paint, including fluorescent paint and reflecting paint.

In another embodiment of the invention, a shopping cart BOB item detection method can be provided. The method can include acquiring an optical image of high contrast material proximate to a shopping cart BOB adjacent to a check stand, determining whether the high contrast material either has become obscured or obstructed by an item in the BOB, and triggering an alert to a check stand clerk in response to determining that the high contrast material has become obscured or obstructed.

In one aspect of the embodiment, determining whether the high contrast material has been obscured or obstructed by an item in the BOB can include detecting high contrast material in a bottom rail of the BOB nearest to the check stand, further detecting high contrast material in a bottom rail of the BOB furthest from the check stand, and determining whether portions of the high contrast material in the bottom rail of the BOB furthest from the check stand have become obscured or obstructed from view relative to portions of the high contrast material in the bottom rail of the BOB nearest to the check stand.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for shopping cart BOB item detection. In accordance with an embodiment of the present invention, a high contrast material can be disposed in proximity to the BOB of a shopping cart, such as on the bottom rails of the shopping cart, or on the floor below the shopping cart BOB. A video camera can be configured to detect the high contrast material and the obscuring of the high contrast material can be viewed as an indication that shopping cart items in the shopping cart have obstructed the view of the video camera. In response, an alert can be issued to the cashier.

Figure 1:
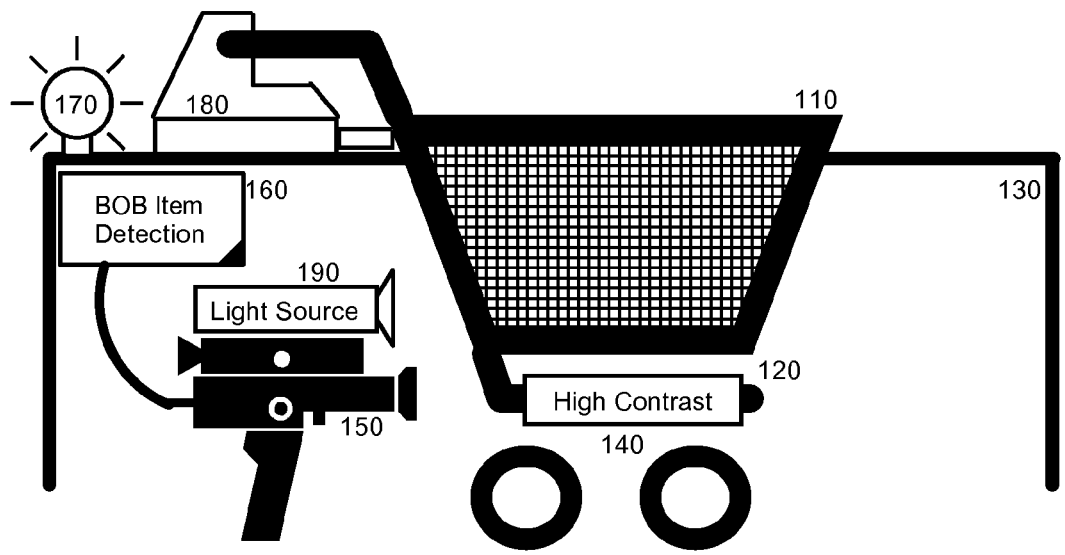
FIG. 1 is a pictorial illustration of a check stand configured for shopping cart BOB item detection.

In further illustration, FIG. 1 is a pictorial illustration of a check stand configured for shopping cart BOB item detection. As shown in FIG. 1, a check stand 130 can be provided in concert with a video sensor 150. The check stand 130 can be configured to accommodate a shopping cart 110 and can include a checkout register 180. A high contrast material 140 such as retro-reflective tape can be placed in proximity to the shopping cart 110 BOB 120 such as below the BOB 120, or on the rails of the BOB 120, to name only two possible positions. The positioning of the high contrast material 140 can be such that an item in the BOB 120 can obscure or obstruct imagery of the high contrast material 140 as viewed by the video sensor 150 illuminated by a light source 190. In an aspect of the embodiment, light source 190 can include an infrared light source incorporating light emitting diodes. Other aspects of the embodiment can include a light source 190 producing ultraviolet light so as to excite fluorescent paint when used as the high contrast material 140.

Figure 2A:
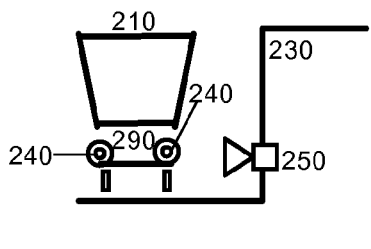
FIGS. 2A through 2C are schematic illustrations of different configurations for the check stand of FIG. 1.

For example, referring to FIG. 2A, the high contrast material 240 can be placed on nylon or plastic hollow tubes and attached to the rails of the BOB 290 of the shopping cart 210 such that an item in the BOB 290 of the shopping cart 210 can obscure or obstruct a view of the high contrast material 240 by a video sensor 250 affixed in proximity to the check stand 230. To this end, the video sensor 250 can be arranged to provide video sensor 250 a sufficient view of the high contrast material 240. Examples include mounting the video sensor 250 above the BOB 290 of the shopping cart 210 and aiming the video sensor 250 at a downwards angle towards the BOB 290. In this way, with an item placed in the BOB 290, the rail of the BOB 290 furthest from the camera 250 will become obscured, while the nearest rail of the BOB 290 to the camera 250 will remain in view. Accordingly, the nearest rail of the BOB 290 can act as a synchronization track to the furthest rail—the detection rail.

Figure 2C:
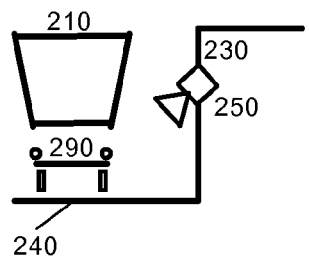
Figure 2B:
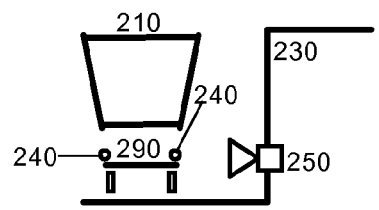

Alternatively, referring to FIG. 2B, the high contrast material 240 such as fluorescent paint, can be painted onto the rails of the BOB 290. As yet a further alternative, as shown in FIG. 2C, the high contrast material 240 can be placed on the floor adjacent to the check stand 230 below the BOB 290. In all cases, the camera 250 can be a monochromatic camera. The camera 250 further can include a set of individual cameras positioned about the check stand 230. When multiple individual cameras are positioned, each can provide item detection for the BOB 290 and the resulting imagery analysis for each of the cameras can be combined to determine whether an item is in the BOB 290.

In any event, referring again to FIG. 1, BOB item detection logic 160 can be coupled to the video sensor 150. The BOB item detection logic 160 can include program code enabled to detect an obscuring or obstruction of the view of the BOB 120 by an item placed in the BOB 120. The detection of the obscuring or obstruction can be facilitated by use of the high contrast material 140. Responsive to detecting an obscuring or obstruction of the high contrast material 140, a coupled alert 170 can be triggered such as a light placed adjacent to the cash register 180 on the check stand 130.

Figure 5:
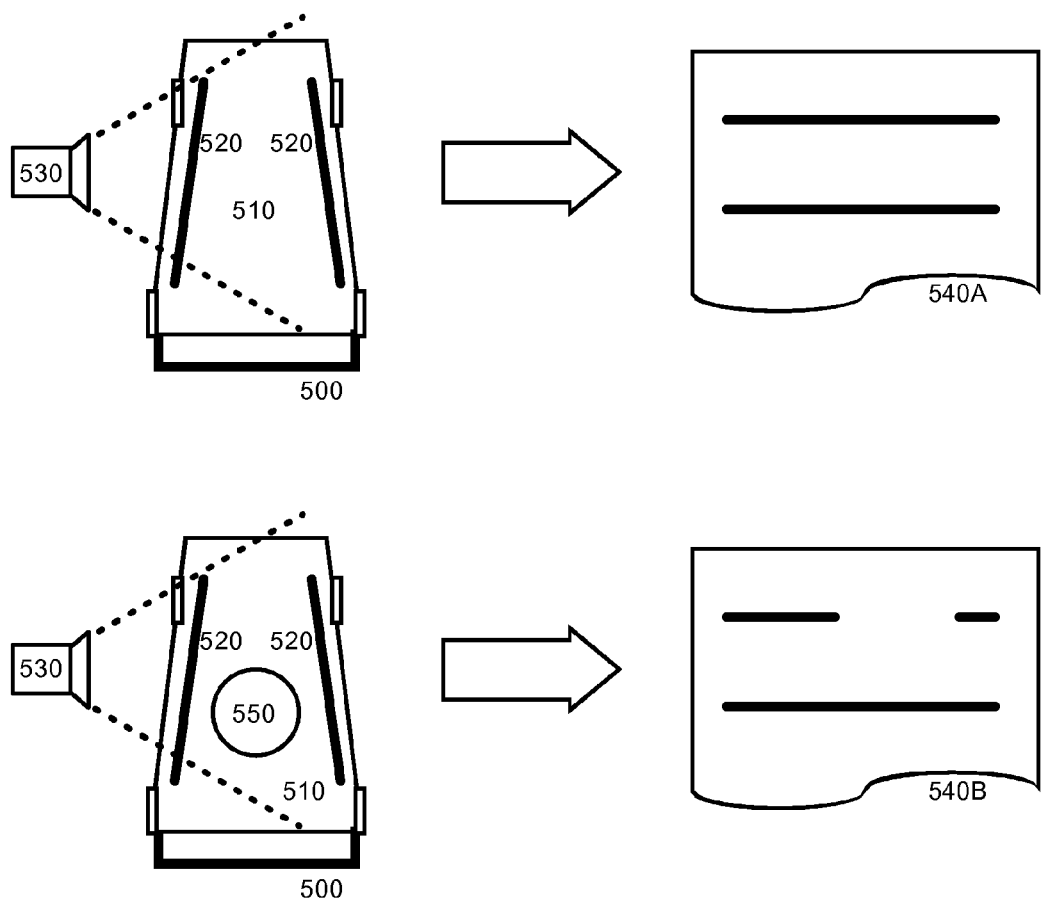
FIG. 5 depicts a top image in which an object is not within a shopping cart BOB and a bottom image in which an object is within the shopping cart BOB.

In specific illustration, FIG. 5 depicts the processed imagery for a shopping cart having an unobstructed, unobscured view of the shopping cart BOB as compared to processed imagery for the same shopping cart having an obstructed view of the shopping cart BOB. In particular, as shown in FIG. 5, a top view of a shopping cart 500 includes a shopping cart BOB 510 and rails 520 with high contrast material applied. In the top image, a video sensor 530 can produce an image that can be processed into the reference template 540A for a shopping cart BOB 510 without items in therein. Referring to the bottom image of FIG. 5, an object 550 placed in the shopping cart BOB 510 can produce an image that can be processed into the non-matching comparison image 540B indicating an obstructed and/or obscured view of the rails 520.

Figure 3:
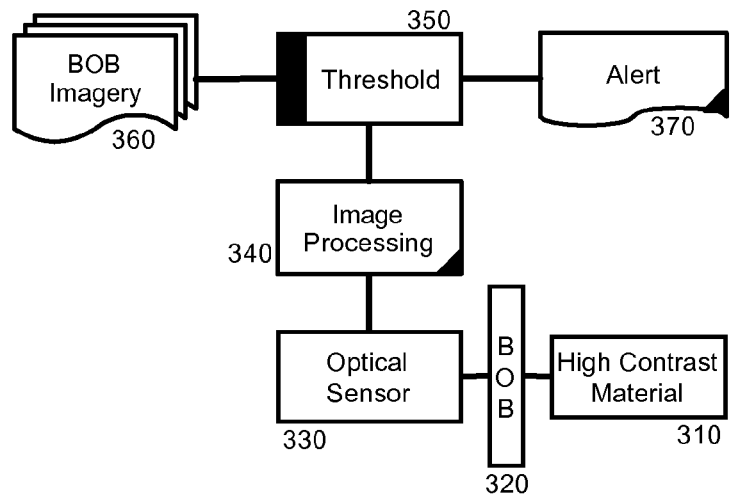
FIG. 3 is a block diagram illustrating a BOB item detection data processing system for use in the check stand of FIG. 1; and, FIG. 4 is a flow chart illustrating a process for BOB item detection in the data processing system of FIG. 3.

In further illustration, FIG. 3 is a block diagram illustrating a BOB item detection data processing system for use in the check stand of FIG. 1. The data processing system can include an optical sensor 330 disposed opposite high contrast material 310 through the BOB 320 of a shopping basket. The optical sensor 330 can be coupled to image processing logic 340. The image processing logic 340 can include program code enabled to compare sensed imagery through the optical sensor 330 to pre-stored BOB imagery 360 to determine whether the view of the high contrast material 310 has become obscured or obstructed due to an item in the BOB 320. Where sensed imagery reflects obscuring and/or obstruction which exceeds a threshold value 350, an alert 370 can be issued.

In a preferred embodiment, image processing logic 340 transforms the image attained through optical sensor 330 into a binary image that best matches (lines up) with the pre-stored BBO imagery 360. A binary image can be attained by applying a threshold to the grayscale values of image attained through optical sensor 330, producing a binary image of the rails 520. Next, the image processing logic 340 can apply an affine transform to the binary rail image to best align the binary rail image to the pre-stored BOB imagery 360. The pre-stored BOB imagery 360 can be a binary rail image from a shopping cart with no items in the BOB and oriented in the most probably position, i.e. shopping cart parallel to the check stand 130.

Figure 4:
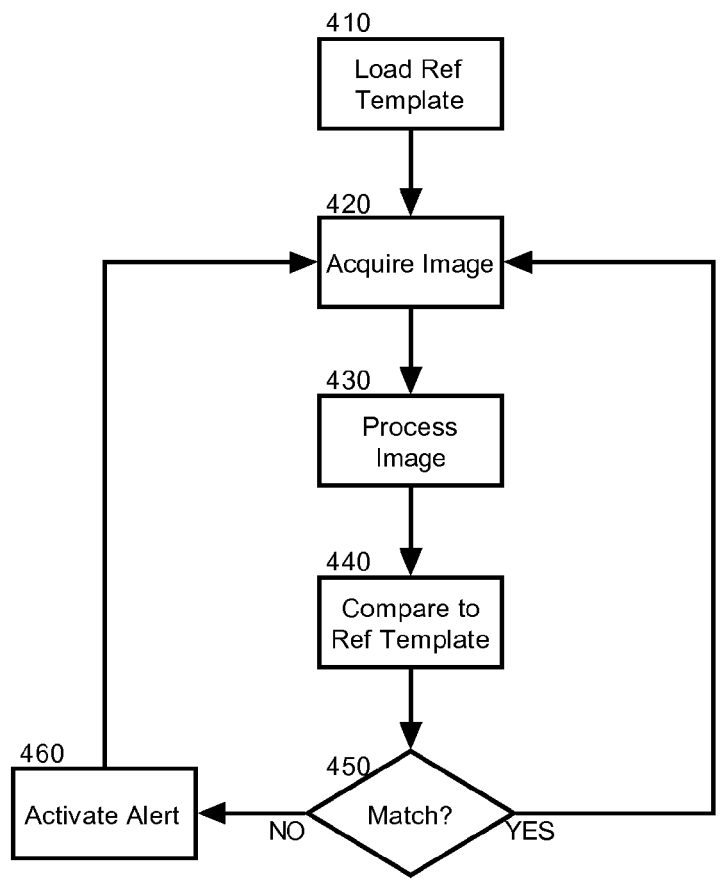

In more specific illustration, FIG. 4 is a flow chart illustrating a process for BOB item detection in the data processing system of FIG. 3. Beginning in block 410, a reference template can be loaded for indicating when an image of the high contrast material associated with the BOB of a shopping cart has become obstructed and/or obscured. In block 420, an image of the BOB of a shopping cart can be acquired. In block 430, the acquired image can be processed and in block 440 processed image can be compared with the loaded reference template. In decision block 450, if the processed image has a disparity with a reference template beyond an acceptable threshold, in block 460 an alert can be activated.

In a preferred embodiment, block 430 received a binary rail image that is aligned with the pre-stored BOB imagery 360 and calculates the mismatch between the two images. The mismatch is calculated as the sum of the exclusive OR (XOR) of each pixel of the two images. Specifically, if a pixel in the pre-stored BOB imagery 360 is different from a corresponding pixel of the rail image (e.g. one is bright the other is dark), a 1 is added to the sum, representing a pixel mismatch. The resulting sum is the score of how dissimilar the two images are. If the mismatch score exceeds a fixed threshold (block 450) an alert is activated (block 460). The threshold is determined experimentally to minimize false accepts and false rejects.

In an alternate embodiment, BOB Imagery 360 can be replaced with a mathematical description and can serve as the reference template (loaded in block 410) and compared (block 440) against the processed image (block 430) to determine (block 450) if high contrast material is obstructed and or obscured. Referring to FIG. 5 the mathematical description of reference template 540A can include two zero slope lines of particular length and particular vertical displacement from each other.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. In a check stand, a shopping cart bottom of the basket (BOB) item detection data processing system comprising:
   high contrast material applied in proximity to a shopping cart BOB;
   an optical sensor positioned to generate an image of the high contrast material;
   BOB detection logic comprising program code enabled to analyze the image to detect one of an obscuring and an obstruction of the high contrast material; and,
   an alert disposed in proximity to a cash register at the check stand and operable to issue an alert responsive to the BOB detection logic detecting one of an obscuring and an obstruction of the high contrast material, wherein the high contrast material is applied to a bottom rail of the shopping cart BOB nearest to the check stand and a bottom rail of the shopping cart BOB furthest from the check stand.

2. The system of claim 1, wherein the high contrast material is applied to a hollow tube surrounding the bottom rail of the shopping cart BOB nearest to the check stand and to a hollow tube surrounding the bottom rail of the shopping cart BOB furthest from the check stand.

3. The system of claim 1, wherein the high contrast material is applied to a floor surface below the shopping cart BOB.

4. The system of claim 1, wherein the high contrast material is one of reflective, retro-reflective and fluorescent material.

5. The system of claim 4, further comprising a light source proximate to the optical sensor.

6. The system of claim 1, wherein the alert is one of a visual alert and an audio alert.

7. The system of claim 1, further comprising additional optical sensors each positioned to generate an image of the high contrast material for analysis by the program code of the BOB detection logic.

8. A shopping cart bottom of the basket (BOB) item detection method comprising:
   acquiring an optical image of high contrast material proximate to a shopping cart BOB adjacent to a check stand;
   determining whether the high contrast material is one of obscured and obstructed by an item in the BOB; and,
   responsive to determining one of an obscuring and an obstruction of the high contrast material, triggering an alert to a check stand clerk, wherein the determining whether the high contrast material is one of obscured and obstructed by an item in the BOB comprises:
  detecting high contrast material in a bottom rail of the BOB nearest to the check stand;
  further detecting high contrast material in a bottom rail of the BOB furthest from the check stand; and
  determining whether portions of the high contrast material in the bottom rail of the BOB furthest from the check stand have become obscured or obstructed from view relative to portions of the high contrast material in the bottom rail of the BOB nearest to the check stand.

9. The method of claim 8, wherein
the acquiring the optical image of the high contrast material proximate to the shopping cart BOB adjacent to the check stand comprises concurrently acquiring multiple different optical images of high contrast material proximate to a shopping cart BOB adjacent to a check stand.

10. The method of claim 8, wherein
the determining whether the high contrast material is one of obscured and obstructed by an item in the BOB comprises comparing a previously stored image of the high contrast material to the optical image to identify differences that exceed a threshold sufficient to conclude that the high contrast material has been one of obscured and obstructed by an item in the BOB.

11. The method of claim 8, further comprising applying the high contrast material to a hollow tube and attaching the hollow tube to a rail on the BOB of the shopping cart.

12. A computer program product comprising a computer usable tangible medium embodying computer usable program code for shopping cart bottom of the basket (BOB) item detection the computer program product comprising:
  computer usable program code for acquiring an optical image of high contrast material proximate to a shopping cart BOB adjacent to a check stand;
  computer usable program code for determining whether the high contrast material is one of obscured and obstructed by an item in the BOB; and,
  computer usable program code for triggering an alert to a check stand clerk responsive to determining an obscuring or an obstruction of the high contrast material,
  wherein
    the determining whether the high contrast material is one of obscured and obstructed by an item in the BOB, comprises:
      detecting high contrast material in a bottom rail of the BOB nearest to the check stand;
      further detecting high contrast material in a bottom rail of the BOB furthest from the check stand; and
      determining whether portions of the high contrast material in the bottom rail of the BOB furthest from the check stand have become obscured or obstructed from view relative to portions of the high contrast material in the bottom rail of the BOB nearest to the check stand.

13. The computer program product of claim 12, wherein the acquiring the optical image of the high contrast material proximate to the shopping cart BOB adjacent to the check stand, comprises concurrently acquiring multiple different optical images of high contrast material proximate to a shopping cart BOB adjacent to a check stand.

14. The computer program product of claim 12, wherein
the determining whether the high contrast material is one of obscured and obstructed by an item in the BOB, comprises comparing a previously stored image of the high contrast material to the optical image to identify differences that exceed a threshold sufficient to conclude that the high contrast material has been one of obscured and obstructed by an item in the BOB.

* * * * *